(12) United States Patent
Gradl et al.

(10) Patent No.: US 10,688,560 B1
(45) Date of Patent: Jun. 23, 2020

(54) METHOD OF MAPPING MELT PATTERN DURING DIRECTED ENERGY FABRICATION

(71) Applicant: United States of America as Represented by the Administrator of the National Aeronautics and Space Administration, Washington, DC (US)

(72) Inventors: Paul R. Gradl, Owens Cross Roads, AL (US); Adam C. Kimberlin, Huntsville, AL (US); Darrell Edwin Gaddy, Valhermoso Springs, AL (US); Roger Derek Moody, Cullman, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 567 days.

(21) Appl. No.: 15/465,324

(22) Filed: Mar. 21, 2017

(51) Int. Cl.
*B22F 3/105* (2006.01)
*B33Y 10/00* (2015.01)
(Continued)

(52) U.S. Cl.
CPC ........ *B22F 3/1055* (2013.01); *B23K 15/0013* (2013.01); *B23K 15/0086* (2013.01);
(Continued)

(58) Field of Classification Search
CPC .. B22F 3/105; B22F 2003/1057; B33Y 30/00; B33Y 10/00; B33Y 50/02; B33Y 50/00;
H04N 5/77; H04N 5/03; B23K 26/034; B23K 26/342; B23K 26/032; B23K 15/0086; B23K 15/0013; B23K 26/1224
See application file for complete search history.

(56) References Cited

U.S. PATENT DOCUMENTS 4,854,724 A * 8/1989 Adams .................. G01N 25/72
374/5
4,960,330 A 10/1990 Kerschmann
(Continued)

OTHER PUBLICATIONS

Chinn et al., "Three Dimensional Imaging of LIGA-Made Microcomponents", Journal of Manufacturing Science and Engineering, 2004, pp. 813-821, vol. 126.

*Primary Examiner* — Dana Ross
*Assistant Examiner* — James F Sims, III
(74) *Attorney, Agent, or Firm* — James J. McGroary; Helen M. Galus

(57) ABSTRACT

A method and system are provided for mapping a melt pattern of material created during directed energy fabrication. An infrared camera and a video camera are provided to record images of the pattern of melted material. Each frame of the infrared camera's images is processed to generate a first map of pixels identifying pixels indicative of a highest temperature greater than or equal to a liquidus temperature of the meltable material. Each frame of the video camera's images is processed to generate a second map of pixels identifying pixels indicative of a highest temperature greater than or equal to the liquidus temperature of the meltable material. The first map of pixels and said second map of pixels are overlaid on each other wherein a third map of pixels is generated and is indicative of a hybrid image of the pattern of melted material.

16 Claims, 4 Drawing Sheets

(51) Int. Cl.
*B33Y 30/00* (2015.01)
*B33Y 50/02* (2015.01)
*B23K 15/00* (2006.01)
*B23K 26/12* (2014.01)
*B23K 26/03* (2006.01)
*B23K 26/342* (2014.01)
*H04N 5/33* (2006.01)
*H04N 5/77* (2006.01)

(52) U.S. Cl.
CPC .......... *B23K 26/032* (2013.01); *B23K 26/034* (2013.01); *B23K 26/1224* (2015.10); *B23K 26/342* (2015.10); *B33Y 10/00* (2014.12); *B33Y 30/00* (2014.12); *B33Y 50/02* (2014.12); *H04N 5/33* (2013.01); *H04N 5/77* (2013.01); *B22F 2003/1057* (2013.01)

(56) References Cited

U.S. PATENT DOCUMENTS

| | | | | |
|---|---|---|---|---|
| 6,815,636 B2 * | 11/2004 | Chung | ............... | G05D 23/1919 219/121.65 |
| 7,009,695 B2 * | 3/2006 | Some | ...................... | G01N 25/72 356/237.1 |
| 2018/0141123 A1 * | 5/2018 | Revanur | ................ | B33Y 50/00 |
| 2018/0193954 A1 * | 7/2018 | Yuan | ...................... | B33Y 50/02 |

\* cited by examiner

METHOD OF MAPPING MELT PATTERN DURING DIRECTED ENERGY FABRICATION

ORIGIN OF THE INVENTION

The invention described herein was made in the performance of work under a NASA contract and by employee(s) of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

1. Field of the Invention

This invention relates to fabrication of three-dimensional metallic parts. More specifically, the invention is a method of mapping the melt pattern of material as three-dimensional parts are being fabricated using directed energy.

2. Description of the Related Art

Additive manufacturing is a rapid fabrication technology that allows parts to be built in a series of thin layers from plastic, ceramics, and metals. Metallic additive manufacturing is an emerging form of rapid fabrication that allows complex structures having precise internal features to be built using various metallic powders or wires. Two well-known types of metallic additive manufacturing processes are powder bed fusion and directed energy deposition. Both types will be described briefly below.

In powder bed fusion, a build process starts with a three-dimensional Computer Aided Design (CAD) model that is "sliced" into a series of two-dimensional Z-height build slices using specialized software. A thin layer of metallic fusible powder (typically, a 0.001-0.002 inch layer) is spread across a base plate using a squeegee or roller. After the fusible powder is spread across in an even layer, a laser or other controllable energy beam melts the powder in a pattern defined from the corresponding Z-slice in the CAD software. After the features in the particular Z-slice have been fully sintered, another thin coat of powder is applied. The laser or other controllable energy beam sinters a patterned portion of the fusible powder to the previous layer. This process continues until the part is completed.

In directed energy deposition, a build process starts with a CAD model that is "sliced" into layers in a single or multiple axes. These layers define the movement of a multi-axis robot having an attached energy source and metallic feed stock. The feed stock is directed into a position where it can be melted by the energy source. The melted material then solidifies to build a freeform structure on an initial base plate. The directed energy source for this deposition process can include, although is not limited to, a laser, an electron beam, an arc, a pulsed-arc, and hybrid sources. A local inert gas purge, large-scale inert chamber, or vacuum chamber is used to prevent oxidation of the melted and solidified material during freeform deposition. The slices from the CAD model define the motion control for the robot to create the freeform structure until the part is completed.

Inspections of metallic additive manufactured parts are generally limited to external geometry and contours, or must use a contact probe to inspect limited internal dimensions. While other techniques such as X-Ray, Ultrasonic (UT), or Computed Tomography (CT) can be used to inspect internal defects and geometry of a part, these techniques also have limitations. X-Ray inspection is a two-dimensional technique and interpreting the X-Ray images often requires expertise. Accordingly, X-Ray inspection is not typically used to provide high-fidelity dimensional inspections of internal features. UT can detect internal flaws, but does not have the resolution needed to detect small flaws and lacks capability to determine the exact location of a defect. UT also generally requires the use of a fluid couplant to allow for wave propagation. While CT inspection is a powerful technique used to determine internal defects and geometry, CT inspection also has some limitations. For example, to provide a three-dimensional view of the inspected component using CT, a series of thin two-dimensional slices are collected and reconstructed into a three-dimensional model. Metallic components requiring inspections using CT often require a series of pulses to penetrate the material. The need to utilize a large number of pulses for each of a series of thin slices can cause inspections to take days or sometimes weeks to obtain 100% coverage of the component.

SUMMARY OF THE INVENTION

Accordingly, it is an object of the present invention to provide a method and system for mapping a melt pattern of material created during a directed energy fabrication process.

Another object of the present invention is to provide a method and system for performing a real-time mapping of a melt pattern generated during a directed energy fabrication process.

Other objects and advantages of the present invention will become more obvious hereinafter in the specification and drawings.

In accordance with the present invention, a method and system are provided for mapping a melt pattern of material created during directed energy fabrication. A directed energy fabrication system includes a controllable energy beam source for generating an energy beam along a directed path. A meltable material is provided in the directed path wherein a selected portion of the meltable material melts to thereby generate a pattern of melted material. An infrared camera and a video camera are provided to record images of the pattern of melted material. The infrared camera has a recording rate of X frames per second and the video camera has a recording rate of Y frames per second wherein Y>X. The video camera is configured to be sensitive only to infrared wavelengths indicative of melting of the meltable material. The infrared camera records a first time sequence of first images of the pattern of melted material, and the video camera records a second time sequence of second images of the pattern of melted material. The first time sequence and second time sequence occur in coincidence. The first images and second images are provided to a processor. Each frame of the first images is processed to generate a first map of pixels identifying pixels indicative of a highest temperature greater than or equal to a liquidus temperature of the meltable material achieved during the first time sequence. Each frame of the second images is processed to generate a second map of pixels identifying pixels indicative of a highest temperature greater than or equal to the liquidus temperature of the meltable material achieved during the second time sequence. The first map of pixels and said second map of pixels are overlaid on each other wherein a third map of pixels is generated and is indicative of a hybrid image of the pattern of melted material.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

Figure 3:
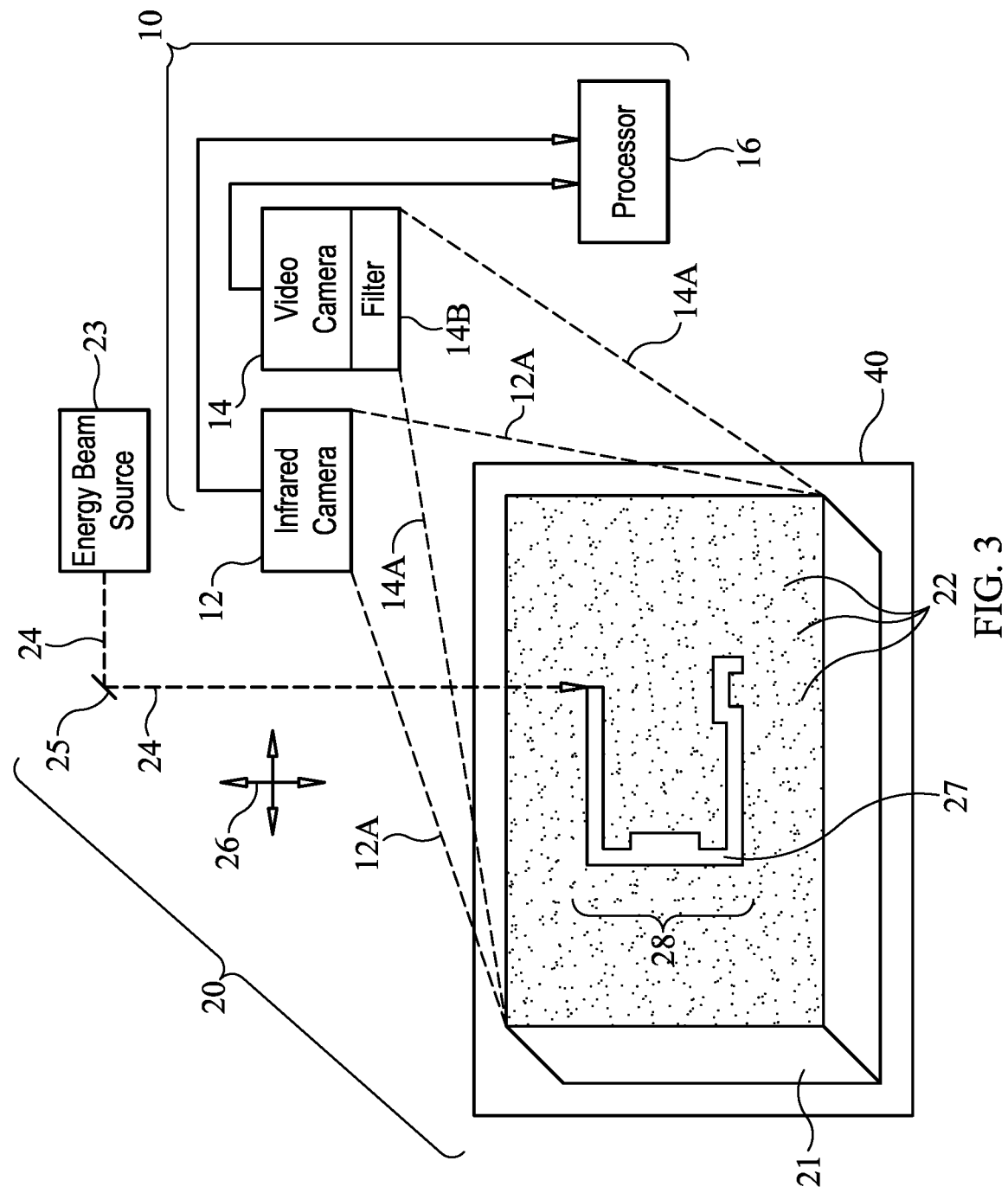
Figure 4:
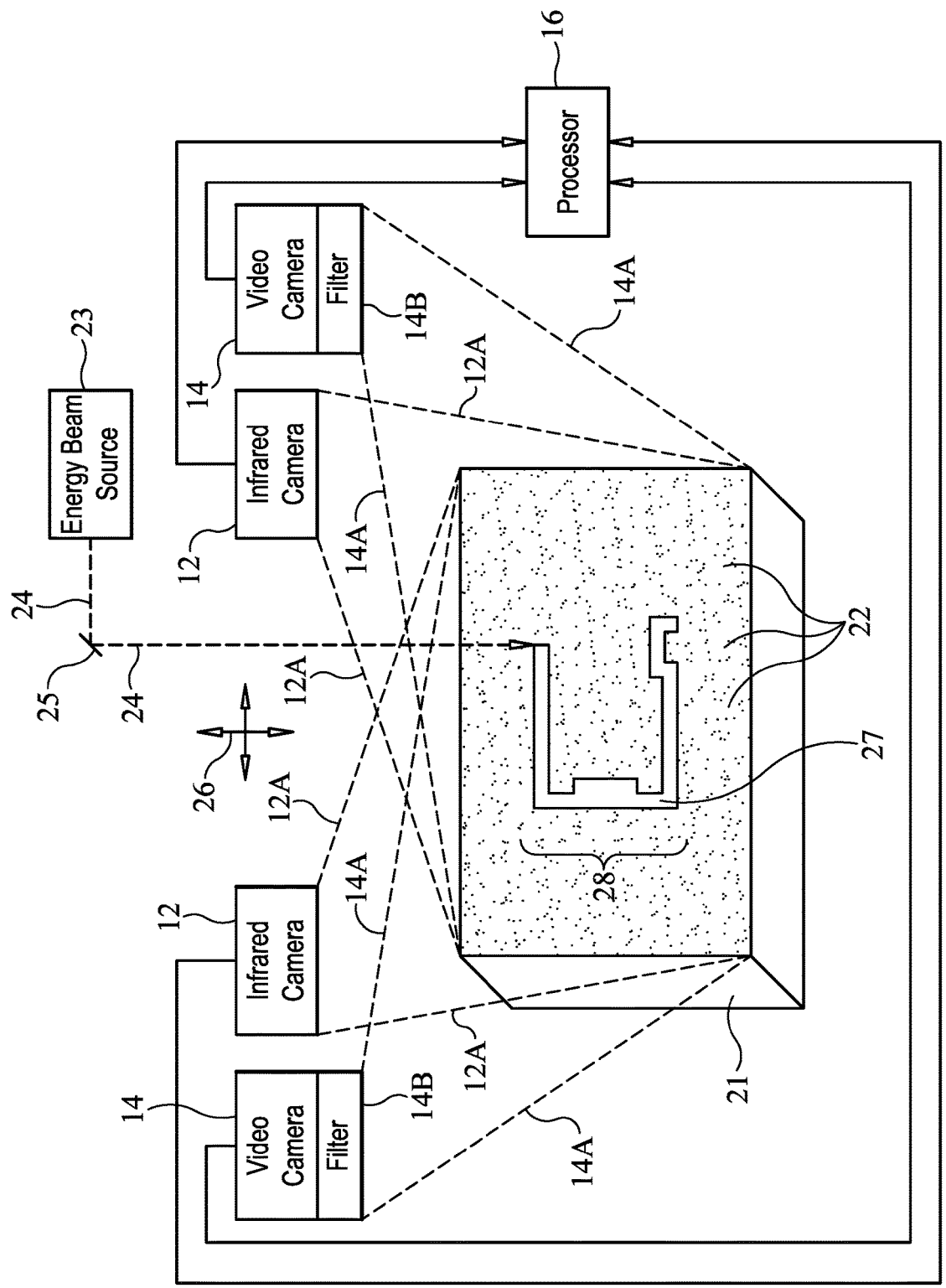

FIG. 3 is a top-level schematic view of a system for mapping a melt pattern of material created during a powder bed fusion fabrication process in accordance with another embodiment of the present invention; and FIG. 4 is a top-level schematic view of a multi-camera system for mapping a melt pattern of material created during a powder bed fusion fabrication process in accordance with still another embodiment of the present invention.

DESCRIPTION OF THE PREFERRED EMBODIMENT(S)

Figure 1:
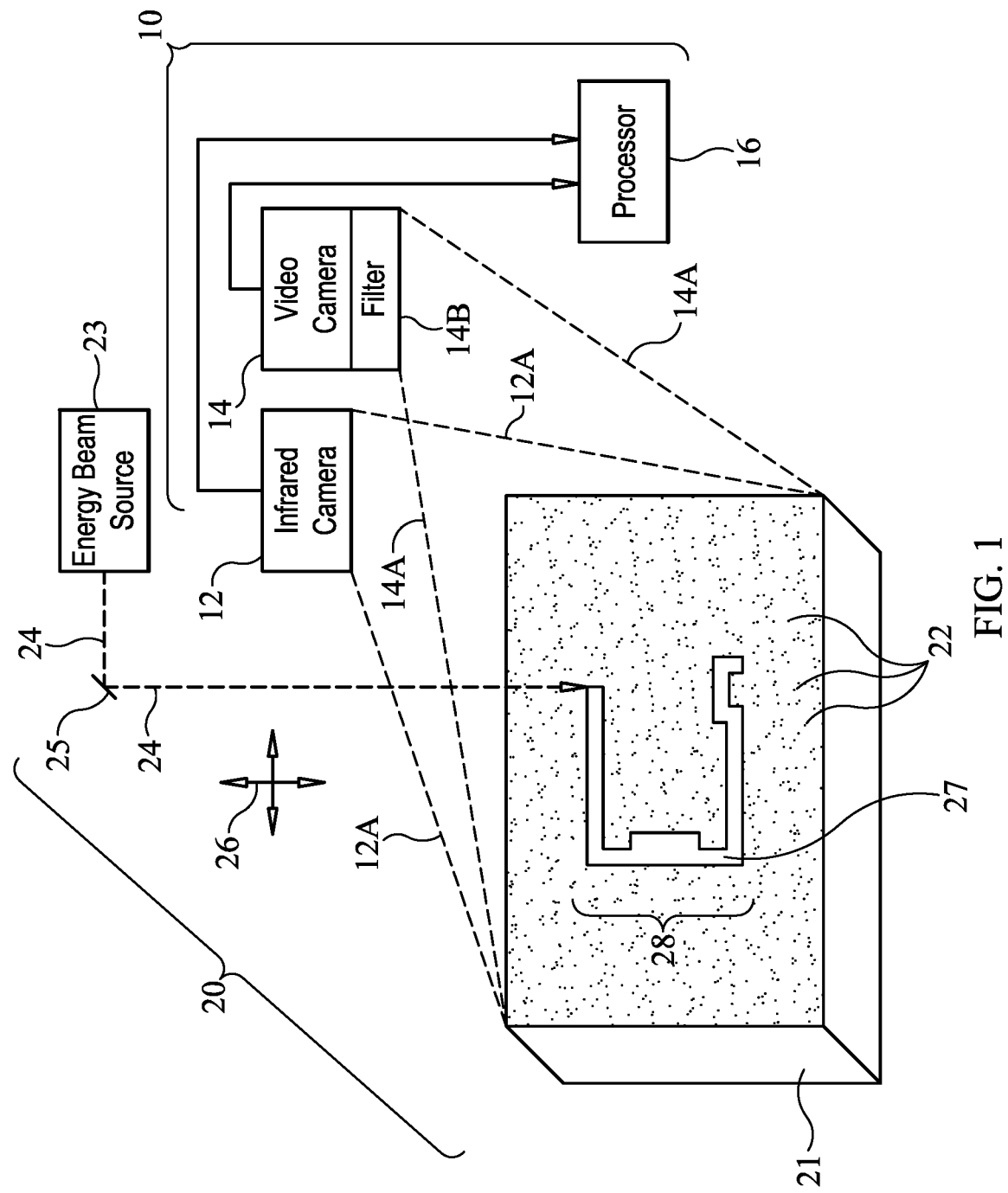
FIG. 1 is a top-level schematic view of a system for mapping a melt pattern of material created during a powder bed fusion fabrication process in accordance with an embodiment of the present invention.

Referring now to the drawings and more particularly to FIG. 1, a system for mapping a melt pattern of material created during a powder bed fusion fabrication process in accordance with an embodiment of the present invention is shown and is referenced generally by numeral 10. While the present invention will be described for its use in mapping a melt pattern during a powder bed fusion process, it is to be understood that the present invention is not so limited. That is, in general, the technique described herein for mapping a melt pattern can be carried out during other additive manufacturing processes to include a directed energy deposition fabrication process in which a fusible powder or wire is provided in the path of an energy beam. Accordingly, it is to be understood that the term "directed energy fabrication" as used herein includes both powder bed fusion fabrication and directed energy deposition fabrication techniques. In all cases, the present invention provides a map of a melt pattern as the pattern is being generated. In this way, a part's inner and outer features can be mapped and monitored during an additive manufacturing process. The resulting map can be used as an inspection tool and/or a feedback control tool to make real-time corrections to an additive manufacturing process.

Mapping system 10 includes an infrared camera 12, a video camera 14, and a processor 16 receiving and processing image data from cameras 12 and 14. For ease of description, the present invention will be explained using a single infrared camera 12 and a single video camera 14. However, it is to be understood that multiple infrared cameras and/or multiple video cameras can be used to provide increased perspective without departing from the scope of the present invention.

Infrared camera 12 has a frame recording rate of X frames per second, while video camera 14 has a frame recording rate of Y frames per second where Y>X. For processing efficiency, Y=NX where N is a whole number greater than 1. For reasons that will be explained further below, video camera 14 is configured to record only infrared wavelengths indicative of melting of the material associated with the generated pattern. For example, video camera 14 can include a filter 14B that only passes the infrared wavelengths of interest (e.g., a range of wavelengths over which melting of the material occurs).

Mapping system 10 generates a map of a melt pattern created during an additive manufacturing process such as powder bed fusion. Briefly and as is known in the art, a powder bed fusion system 20 includes a bed 21 of a fusible powder 22 and a controllable energy beam source 23 such as a laser or electron beam. Beam source 23 generates a beam 24 of energy. Beam 24 impinges upon an exposed layer of fusible powder 22 in accordance with a prescribed translational pattern indicated by translation arrows 26. Whenever beam 24 impinges upon the exposed layer of fusible powder 22, the fusible powder melts to become melted material 27. This process can be carried out in an inert gas (e.g., argon) purge to prevent oxidation of melted material 27. A pattern 28 of melted material 27 is generated for the exposed layer of fusible powder 22. Pattern 28 essentially represents a two-dimensional slice of a part being fabricated as is known in the art.

In accordance with the present invention, both infrared camera 12 and video camera 14 are positioned to image bed 21 and its exposed layer of fusible powder 22. Furthermore, cameras 12 and 14 are fixed in position such that the field of view of infrared camera 12 (indicated by the region between dashed lines 12A) and the field of view of video camera 14 (indicated by the region between dashed lines 14A) overlap or nearly overlap so that the images produced by each camera are in registration with one another.

Cameras 12 and 14 are operated to simultaneously record a sequence of images during the generation of pattern 28 of melted material 27. The sequence of images recorded by infrared camera 12 and the sequence of images recorded by video camera 14 are provided to processor 16. In general, each time sequenced set of images is processed to generate a map of image pixels that are indicative of pattern 28.

The images from infrared camera 12 are processed to provide the general outline of pattern 28. However, the speed at which system 20 is able to sinter or melt fusible material 22 is faster than the speed of infrared camera 12. This speed discrepancy can cause melt pattern details to be missed by infrared camera 12 as the material is melted and cools. In order to provide a better resolution for imaging pattern 28, the higher speed video camera 14 provides the details of pattern 28 missed by infrared camera 12. The video camera frame rate does not need to match the speed of the sintering of the material, but matches the predicted thermal transient times at which the material would pass through a liquidus and then solidus state. A more definitive material melt temperature is also established through the use of a calibrated infrared camera which provides adjacent pixels to the video camera data for further verification of melted regions.

The present invention introduces a real-time dimensional inspection technique into the additive manufacturing build process. Briefly, the camera images are processed to define the contrast between the pixels of the areas that have been sintered or melted (i.e., heated to a certain temperature range) and the surrounding virgin powder areas that are not melted. The pixel contrast, or difference in temperatures, defines a part's geometry for that particular Z-height layer present on the exposed layer of the fusible powder. A complete model can be built by combining each of these layers to produce a complete as-built three-dimensional model that is essentially developed in reverse of the original CAD model that was sliced for the additive manufacturing build. The as-built inspection geometry could be compared throughout each layer to the original CAD sectioned model (i.e., discrete Z-height slice), a thermal analysis model based on the two-dimensional layers or three-dimensional model, or a complete as-built three-dimensional model could be compared to the original CAD model.

In order to properly define the correct geometry from the build, the cameras must be calibrated to define the proper camera angle, common pixels, appropriate level of contrast definition, stand-off distance, lens distortion, and resolution of features that can be measured. The calibration defines the scaling and position of the pixels from the infrared images and also ensures that dimensions are consistent throughout the coordinate system. Calibration of the cameras can be completed in a variety of ways without departing from the scope of the present invention.

By way of example, one suitable calibration technique will be described herein. A panel encompassing a series of alternating squares (e.g., a checkerboard pattern), a series of symmetrical circles (e.g., an ellipse pattern), or other geometric shapes with defined dimensions, is positioned where the exposed layer of fusible material is to be melted. The panel is then imaged by the cameras in one or more orientations. The alternating squares or circles must have a defined variant emissivity ($\varepsilon$) that can be achieved using different emissivity coatings, paints, or material inserts. The geometric patterns must have precise geometry since this is what establishes the cameras' initial calibration. To determine a variation in temperature, the panel can be heated using a flash lamp or resistance heated from the back side. A proper calibration will depend on fairly even heating across the panel.

Once the panel is heated, the cameras must each define the areas with temperature differences. A series of infrared images are recorded to determine the areas with varying temperatures. Using image processing techniques from the raw infrared image data, the intersection of the squares or the perimeter of the circles are defined by the pixel contrast from temperature differences. Further processing of this data defines a distance or number of pixels between each of the square intersections. For example, if the circle/ellipse method is being used, the center of the ellipse is determined and distances to and from each of the circles/ellipses is measured. The distances determined from each the square intersections (or ellipse centers) determined by the infrared images defines one calibration sequence. Several calibration sequences can be completed and the distances measured from each of the common pixel intersections or ellipse centers are compared. This determines the scaling and repeatability in varying orientations. This calibration technique is similar to those used for various structured light scanning systems. The calibration image sequences can be completed from different angles, stand-off distances, rotations, and orientations of the calibration panel.

An additional calibration can be used for absolute temperature correction of the cameras in the assumed temperature range of melting. This calibration again uses panels made from varying emittance coatings or materials. A high-emittance coating or material ($\varepsilon > 90\%$) and a low-emittance coating or material ($\varepsilon < 10\%$) can be used to cover the emissivity values or range that will be observed during data collection since a liquidus state of a meltable material will have a much different emittance than the same material in its un-melted state. The spectral emissivity of these known emissivity materials must be fully characterized in the temperature range and wavelength that will be recorded by the cameras. This calibration uses a panel with a known geometric pattern (e.g., such as the technique described above) although this time the panel is heated to the minimum temperature range being measured by the camera. A non-optical measurement device such as thermocouples or thermopiles can be used to verify and calibrate the cameras. Following the calibration(s), the cameras' setup and positions must be maintained. Ideally, the calibration is completed in the same location (i.e., the build chamber) where the data will be collected. A further absolute temperature calibration is also conducted where images from the infrared camera and filtered video camera are compared against a blackbody reference temperature. This absolute temperature correction is a common calibration known in the field of infrared thermography.

The cameras are positioned inside of the build chamber such that they have a view of the entire build area. Part geometry is defined by the variation in color or grayscale difference of each individual pixel between the melted regions of the build area and the un-melted areas (e.g., fusible powder 22) based on the discrete temperature differences. The images are processed to highlight a temperature range of interest, which will generally be the liquidus and solidus temperature range of the material that is to be melted and subsequently solidified. Data is collected over time during the entire build of each Z-height layer thereby effectively capturing temperature as a function of time as the above-described pattern 28 is generated. In terms of image processing, digital counts are converted to temperatures values for calculations, which can be converted to color ranges or monochrome for display. To define the geometry, a point is placed at the intersection of each of the pixels (in X and Y directions) with high contrast, or significant temperature differences (melted vs. un-melted).

Figure 2:
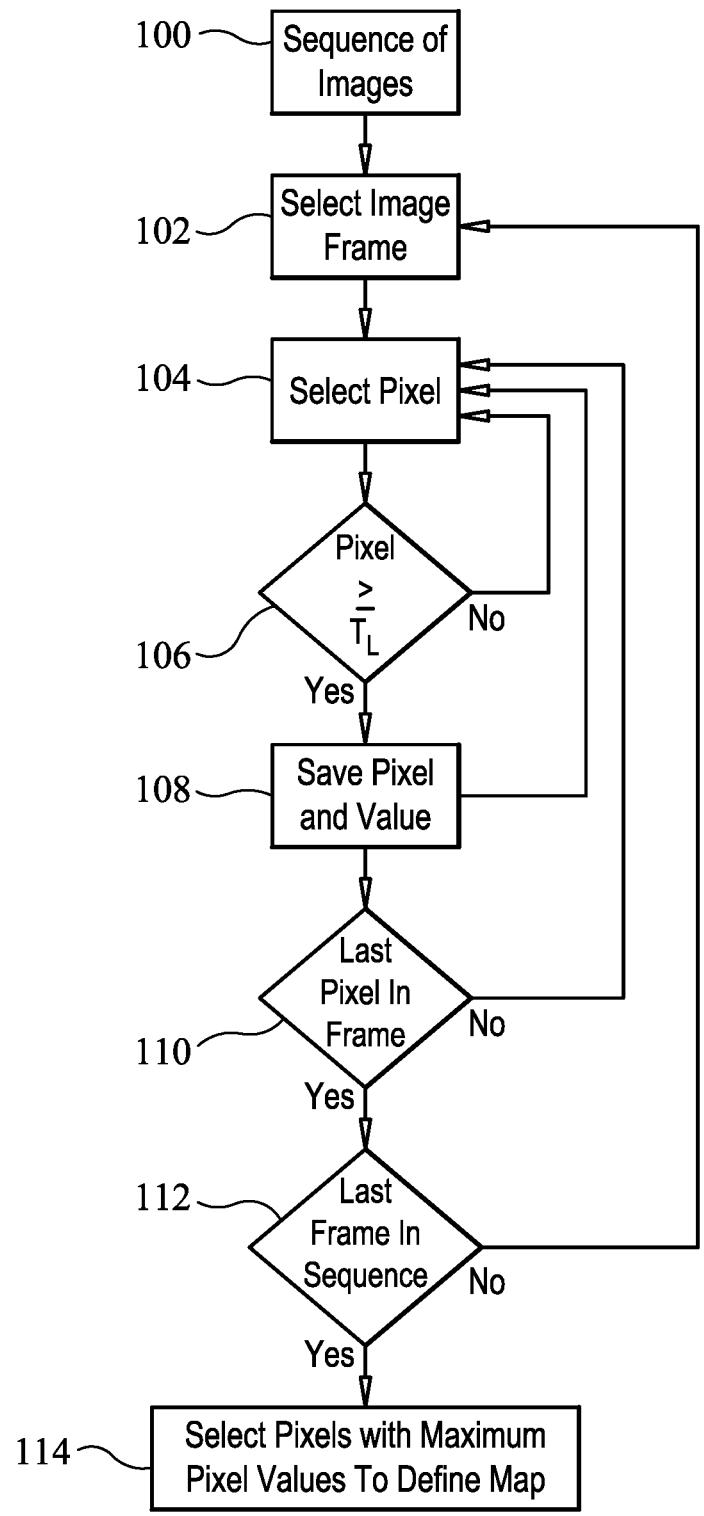
FIG. 2 is a flow diagram of the image processing technique applied to the time sequence of infrared images and the time sequence of the video images in accordance with an embodiment of the present invention.

The time sequence of images recorded by infrared camera 12 and the time sequence of images recorded by video camera 14 are processed in the same fashion by processor 16. Referring now to FIG. 2, a single flow diagram of the processing steps for each time sequence of images is shown. At step 100, the time sequence of images is provided. A single frame of an image is selected at step 102 for processing on a pixel-by-pixel basis as indicated by step 104. The image value of each pixel of the selected image is compared at step 106 to an image value indicative of the liquidus temperature (TL) of the meltable material (such as powder 22) determined during calibration. Pixels satisfying the TL criteria for an image frame are stored at step 108 in addition to the digital pixel counts to later reference absolute temperatures, if needed. If a pixel does not satisfy the TL criteria, the pixel and value are not saved and the next pixel in the image frame is evaluated. (Another option is to save an image frame's entire array of pixels, but turning "off" any of the pixels not found to satisfy the melt criteria.) If the pixel and value are saved, step 110 determines if there are any more pixels in the image frame and returns processing to step 104. Once all pixels in an image frame have been processed, step 112 determines if the last frame in a time sequence of images (i.e., either a time sequence from infrared camera 12 or a time sequence from video camera 14) has been processed. If the last frame from sequence has not been processed, processing returns to step 102 where the next image frame from a time sequence of images is selected. When step 112 determines that all image frames from a time sequence have been processed, the saved pixels and values from step 108 are processed to select those pixels having the maximum pixel value. The resulting set of pixels defines a map (i.e., an image map) of the above-described pattern 28 of melted material 27.

The map of pixels generated from the time sequence of images recorded by infrared camera 12 are combined with the map of pixels generated from the time sequence of images recorded by video camera 14. In an image sense, the two maps are overlaid on one another to create a new map that is indicative of pattern 28. The use of two images provides a robust inspection technique/tool. Furthermore, since cameras 12 and 14 are positioned to record their images simultaneously and in registration, the two maps of the melt pattern will align. The map generated from the video images provides fine resolution that the map generated from the infrared images might have missed.

Since all geometry is accessible throughout the build, the internal and external features of a fabricated part can be mapped. Since the Z-height for each two-dimensional or exposed layer is known, the part outline from each of these layers can be stacked in succession of their creation to develop a full three-dimensional model of all internal and external features. That is, the combined map of pixels generated by the present invention for each layer is combined/stacked with successive layers to effectively construct a three-dimensional image of the fabricated part.

In directed energy fabrication processes in which a fusible powder is selectively melted, the melted material is fused locally to a previously melted portion. Due to superheating of the powder and surrounding inert gas, rapid expansion takes place and some of the residual powder will eject above and/or about the build location. This can cause what is known as "sparking" (i.e., a bright cloud that results from residual powder ejection) that can limit direct viewing of the melt pool. A solution to this problem is to complete successive builds in a vacuum chamber to eliminate the expansion of the localized inert gas. Accordingly, FIG. 3 illustrates the above-described bed 21 of fusible powder disposed in a vacuum chamber 40.

The sparking problem can also be addressed using image processing techniques when multiple infrared cameras 12 and multiple video cameras 14 are used as shown in FIG. 4. Since it is known that sparking occurs above the plane of the layer being built and since the cameras are calibrated in a three-dimensional mode, the image data can be clipped above the two-dimensional build plane in ways well understood in the art.

The advantages of the present invention are numerous. The method and system provide a real-time inspection technique capable of tracking with the speed of rapid fabrication metallic additive manufacturing technologies. The present invention eliminates the need for post-build inspections to be completed since the inspection data is collected during the build. Measurements of complex internal geometry features are readily mapped. The present invention could be readily incorporated into a closed-loop feedback control system such that real-time adjustments could be made to the build process and part being fabricated. The two-dimensional cross-section pixel maps can be stacked to construct a three-dimensional model for comparison to original CAD geometry or a three-dimensional steady-state or transient thermal analysis model during the build cycle. Thus, the present invention provides a substantial advancement in the fabrication of complex parts to include a variety of rocket (or other vehicle) nozzles and components and/or flow controlling elements.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of mapping a melt pattern of material created during directed energy fabrication, comprising the steps of:
   providing a directed energy fabrication system to include a controllable energy beam source for generating an energy beam along a directed path;
   providing a meltable material in said directed path wherein a selected portion of said meltable material melts to thereby generate a pattern of melted material;
   providing an infrared camera and a video camera, said infrared camera having a recording rate of X frames per second and said video camera having a recording rate of Y frames per second wherein Y>X, said video camera configured to be sensitive only to infrared wavelengths indicative of melting of said meltable material;
   recording, using said infrared camera, a first time sequence of first images of said pattern of melted material;
   recording, using said video camera, a second time sequence of second images of said pattern of melted material, said first time sequence and said second time sequence occurring in coincidence;
   providing said first images and said second images to a processor;
   processing, using said processor, each frame of said first images to generate a first map of pixels identifying pixels indicative of a highest temperature greater than or equal to a liquidus temperature of said meltable material achieved during said first time sequence;
   processing, using said processor, each frame of said second images to generate a second map of pixels identifying pixels indicative of a highest temperature greater than or equal to said liquidus temperature of said meltable material achieved during said second time sequence; and
   overlaying, using said processor, said first map of pixels and said second map of pixels wherein a third map of pixels is generated, said third map of pixels being indicative of a hybrid image of said pattern of melted material.

2. A method according to claim 1, wherein Y=NX, and wherein N is a whole number greater than 1.

3. A method according to claim 1, wherein said directed energy fabrication system comprises a powder bed fusion system and said meltable material comprises a fusible powder, wherein said steps of recording, processing, and overlaying are repeated for a successive plurality of exposed layers of said fusible powder.

4. A method according to claim 3, further comprising the step of constructing, using said processor, a three-dimensional image using each said third map of pixels from said successive plurality of exposed layers of said fusible powder.

5. A method according to claim 1, further comprising the step of maintaining said meltable material in a vacuum chamber while said pattern of melted material is generated.

6. A method according to claim 1, wherein said directed energy fabrication system comprises a directed energy deposition system, and wherein said meltable material is selected from the group consisting of a fusible powder and a wire.

7. A method of mapping a melt pattern of material created during powder bed fusion fabrication, comprising the steps of:
   providing a powder bed fusion system to include a bed of fusible powder and a controllable energy beam source for melting a selected portion of an exposed layer of said fusible powder wherein a pattern of melted material is generated;
   recording, using at least one infrared camera having a recording rate of X frames per second, a first time sequence of first images of said bed as said energy beam source melts said selected portion of said exposed layer of said fusible material;
   recording, using at least one video camera having a recording rate of Y frames per second, a second time sequence of second images of said bed as said energy beam source melts said selected portion of said exposed layer of said fusible material, said second images being recorded simultaneously with said first images, wherein Y>X, and wherein each said video camera is configured to be sensitive only to infrared wavelengths indicative of melting of said fusible powder;
   providing said first images and said second images to a processor;
   processing, using said processor, each frame of said first images to generate a first map of pixels identifying pixels indicative of a highest temperature greater than or equal to a liquidus temperature of said fusible powder achieved at a corresponding location of said bed during said first time sequence;
   processing, using said processor, each frame of said second images to generate a second map of pixels identifying pixels indicative of a highest temperature greater than or equal to said liquidus temperature of said fusible powder achieved at a corresponding location of said bed during said second time sequence; and
   overlaying, using said processor, said first map of pixels and said second map of pixels wherein a third map of pixels is generated, said third map of pixels being indicative of a hybrid image of said pattern of melted material.

8. A method according to claim 7, wherein Y=NX, and wherein N is a whole number greater than 1.

9. A method according to claim 7, wherein said steps of recording, processing, and overlaying are repeated for a successive plurality of exposed layers of said fusible powder.

10. A method according to claim 9, further comprising the step of constructing, using said processor, a three-dimensional image using each said third map of pixels from said successive plurality of exposed layers of said fusible powder.

11. A method according to claim 7, further comprising the step of maintaining said bed of fusible powder in a vacuum chamber while said pattern of melted material is generated.

12. A method according to claim 7, wherein said steps of recording use a plurality of infrared cameras and a plurality of video cameras, said method further comprising the step of limiting said steps of processing to portions of said first images indicative of said exposed layer and portions of said second images indicative of said exposed layer.

13. A system for mapping a melt pattern of material created during directed energy fabrication in which a controllable energy beam source generates an energy beam along a directed path for impingement on a meltable material wherein a selected portion of said meltable material melts to thereby generate a pattern of melted material, said system comprising:
   at least one infrared camera having a recording rate of X frames per second, each said infrared camera recording a first time sequence of first images of said pattern of melted material;
   at least one video camera having a recording rate of Y frames per second, each said video camera recording a second time sequence of second images of said pattern of melted material, said first images and said second images are recorded simultaneously, wherein Y>X, and wherein each said video camera is configured to be sensitive only to infrared wavelengths indicative of melting of said meltable material; and
   a processor coupled to each said infrared camera and each said video camera,
   said processor processing each frame of said first images to generate a first map of pixels identifying pixels indicative of a highest temperature greater than or equal to a liquidus temperature of said meltable material achieved during said first time sequence,
   said processor processing each frame of said second images to generate a second map of pixels identifying pixels indicative of a highest temperature greater than or equal to said liquidus temperature of said meltable material achieved during said second time sequence, and
   said processor combining said first map of pixels and said second map of pixels to generate a third map of pixels indicative of a hybrid image of said pattern of melted material.

14. A system as in claim 13, wherein Y=NX, and wherein N is a whole number greater than 1.

15. A system as in claim 13 wherein said meltable material comprises a bed of fusible powder, and wherein each said infrared camera and each said video camera is positioned to include said bed of fusible powder wherein said first images are in registration with said second images.

16. A system as in claim 13, further comprising a vacuum chamber surrounding said meltable material.

* * * * *